United States Patent [19]

Iwano et al.

[11] 3,867,419

[45] Feb. 18, 1975

[54] PROCESS FOR THE PREPARATION OF AN AQUEOUS SOLUTION OF AN IRON (III)-AMINOPOLYCARBOXYLIC ACID COMPLEX COMPOUND

[75] Inventors: Haruhiko Iwano; Sachio Matsushita, both of Kanagawa, Japan

[73] Assignee: Fuji Photo Film Co., Ltd., Kanagawa, Japan

[22] Filed: June 29, 1973

[21] Appl. No.: 375,238

[30] Foreign Application Priority Data

July 28, 1972 Japan................................ 47-75761

[52] U.S. Cl. .................................. 260/439 R, 96/49
[51] Int. Cl. .......................................... C07f 15/02
[58] Field of Search ...................... 260/439 R, 429 J

[56] References Cited
UNITED STATES PATENTS

| | | | |
|---|---|---|---|
| 2,395,307 | 2/1946 | Weber et al. ................... | 260/439 R |
| 2,766,268 | 10/1956 | Skelly............................. | 260/439 R |
| 2,921,847 | 1/1960 | Knell et al...................... | 260/439 R |
| 3,107,260 | 10/1963 | Knell.............................. | 260/439 R |
| 3,115,511 | 12/1963 | Singer et al..................... | 260/439 R |
| 3,133,942 | 5/1964 | Hahl............................... | 260/439 R |
| 3,351,658 | 11/1967 | Bersworth....................... | 260/429 J |
| 3,507,892 | 4/1970 | Bersworth....................... | 260/429 J |
| 3,557,200 | 1/1971 | Bersworth....................... | 260/439 R |
| 3,767,689 | 10/1973 | Donovan et al................. | 260/429 J |

*Primary Examiner*—Arthur P. Demers
*Attorney, Agent, or Firm*—Sughrue, Rothwell, Mion, Zinn & Macpeak

[57] ABSTRACT

A process for the preparation of an aqueous solution of an iron(III)-aminopolycarboxylic acid complex compound characterized by mixing aminopolycarboxylic acid or a salt thereof and metallic iron in an aqueous medium and reacting the mixture with oxygen in the presence of a water soluble iron salt.

15 Claims, No Drawings

PROCESS FOR THE PREPARATION OF AN AQUEOUS SOLUTION OF AN IRON (III)-AMINOPOLYCARBOXYLIC ACID COMPLEX COMPOUND

BACKGROUND OF THE INVENTION

Field of the Invention

This invention relates to a process for the synthesis of iron(III)-aminopolycarboxylic acid complex compounds, more particularly, to a process for the preparation of an aqueous solution of an iron(III)-aminopolycarboxylic acid complex compound.

Description of the Prior Art

Water soluble salts of iron(III)-aminopolycarboxylic acid complex compounds are well known. Typical examples thereof are iron(III)-ethylenediaminetetraacetic acid salts (hereinafter called iron(III)-EDTA complex salts) such as iron(III)-sodium ethylenediaminetetraacetate dihydrate.

Such compounds are widely used as components of a bleachfixing solution for color photography (for example, see German Pat. No. 866,605; Swiss Pat. No. 336,257; Japanese Publication 1,478/1960; British Patent Nos. 1,014,396 and 991,412; or the development methods used by the main photographic companies in Europe, which are reported at pages 122–123 and 126 of "The British Journal of Photography" (1960)).

As complex salts which are used for such applications, there are known a number of complex salts of aminopolycarboxylic acids such as iron(III)-nitrotriacetic acid complex salt, iron(III)-N-hydroxyalkylethylenediaminetriacetic acid complex salt, and the like, in addition to the iron(III)-EDTA complex salt.

Current methods for preparing a bleach-fixing solution containing a water soluble salt of an iron(III)-aminocarboxylic acid complex such as the ammonium salt of iron(III)-EDTA have disadvantages. For example, ammonium salts of iron(III)-aminopolycarboxylic acid complex salts (such as an ammonium ethylenedinitrotetraacetate iron(III) complex salt) are prepared by heating an aqueous solution of a water soluble ferric salt such as ferric nitrate, sulfate or chloride together with EDTA. The resulting complex salt is always contaminated by unwanted nitrate, sulfate or chloride ions.

To avoid this contamination, one method is known wherein a water soluble ferric salt is reacted with ammonia to precipitate ferric hydroxide, which is then freed from anions by repeated washing, centrifuging and decantation, and the resulting ferric hydroxide is reacted with EDTA and neutralized with ammonium hydroxide ("Inorg. Chem." 2 127 (1963)). This method is very effective but used only with difficulty on an industrial scale because the separation of ferric hydroxide from anions requires expensive equipment and much labor.

Further, a method is described in Japanese Laid-Open to Public Inspection Application 1318/1971 wherein ferric or ferrous oxide or $Fe_3O_4$ together with aminopolycarboxylic acid or a partially neutralized aminopolycarboxylic acid are heated in an aqueous medium to form the iron(III)-aminopolycarboxylic acid complex compound. According to this method, the complex salt does not contain inconvenient impurities such as the chloride or sulfate, but the dissolution rate of iron oxide into the aqueous solution of aminopolycarboxylic acid is very low, which means a long time is required for the synthesis. For example, in the reaction of N-hydroxyethylethylenediamine triacetic acid with iron oxide, a large amount of unreacted iron oxide remains 20 hrs. in a boiling water bath at 100°C. Accordingly, the manufacture of aqueous solutions of complex compounds on an industrial scale is difficult.

SUMMARY OF THE INVENTION

Therefore, the object of this invention is to provide a simple method of obtaining an aqueous solution of an iron(III)-aminopolycarboxylic acid complex salt which is free from impurity ions.

As a result of many experiments to attain the above-mentioned object, it has been found that such a process comprises mixing an aminopolycarboxylic acid or a salt thereof together with metallic iron in an aqueous medium and subjecting the mixture to reaction with oxygen in the presence of a water soluble iron salt.

DETAILED DESCRIPTION OF THE INVENTION

In the process according to this invention, it is important to react with oxygen in the presence of water soluble iron salt. That is, oxygen is necessary in the process because the ionizing dissolution of metallic iron does not proceed without oxygen.

The presence of the water soluble iron salt or salts promotes the dissolution rate of metallic iron, so that the water soluble iron salt should be present in the reaction system.

The iron salt dissolves only gradually when the reaction takes place, so that water soluble iron salt in a very slight amount can be sufficient (e.g., about 0.1 percent by weight of the iron (III) complex salt to be synthesized). Of course, the greater the amount of water soluble iron salt, the faster the reaction takes place, resulting in a shortened synthesis time. In practice, 1–10 percent by weight of an iron salt or salts is preferable, considering the time and yield of the synthesis. The amount of the iron salt can be less than 1% by weight or more than 10 percent by weight considering only the time or yield of the synthesis. In such a case, a result better than in prior art methods is obtained.

The exact water-soluble iron salt used is not overly important, and, generally speaking, any water-soluble iron salt or a mixture of water-soluble iron salts can be used. Most preferred of the water-soluble iron salts are, however, salts of iron and an inorganic acid, including double salts thereof such as ferrous ammonium sulfate or ferric ammonium sulfate and simple salts such as iron chloride, ferrous or ferric sulfate, ferrous or ferric nitrate, etc.

A part of the iron(III) complex salt, which has already been synthesized, may be used in order to avoid the supply of impurity ions to the system. For example, if the water-soluble iron salt is used, $SO_4^{-2}$, $NO_3^{-1}$ or $Cl^-$ are not generated as impurity ions, so if the generation of impurities is to be strongly avoided, the Fe(III)-aminopolycarboxylic acid complex salt can be used in place of the water-soluble iron salt.

Generally speaking, in the reaction system of the present invention good results are obtained when the pH is greater than 0 to about 9, and most excellent results are obtained when the pH is maintained within the range of 2 to 6.

As mentioned above, the presence of oxygen is necessary. Oxygen can be supplied in any desired manner. For example, air can be blown into the reaction vessel to contact the reaction mixture and oxygen. In this case, small air bubbles in a large amount are blown in to provide a large contact area which gives a greater effect. The amount of oxygen is merely that necessary for the reaction. However, practically speaking, air will be used as the oxygen source of the present invention and the general rule is that unexhausted or unused air (oxygen) is present in the system at reaction completion. Accordingly, on a commercial scale air is merely bubbled into the system in excess of that required for the reaction.

The metallic iron used for the preparation of the iron(III)-aminopolycarboxylic acid complex salt can be any kind of iron material having a large surface area such as a fine iron wire in the form of fibers (steel wool), iron powder, iron flakes, iron wire, etc. Steel wool is preferably used for a low cost process.

The amount of metallic iron used is approximately equimolar to the aminopolycarboxylic acid or up to about 10 percent less than equimolar to prepare a pure iron complex salt. However, in the case where a mixture of the iron complex salt and the free acid is to be obtained, the amount of metallic iron can be less than the above preferred amount to obtain the desired concentration of free acid. It shall thus be understood that the above range is not limitative.

The aminopolycarboxylic acids used in the present invention are compounds which have an amino group and at least two carboxyl groups in the molecule, and are capable of forming a chelate with a ferric ion.

The acids can be represented by the formulae:

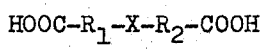

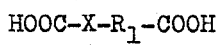

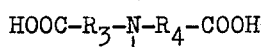

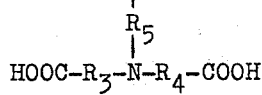

or

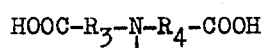

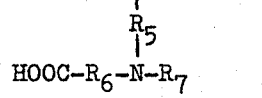

wherein $R_1$, $R_2$, $R_3$, $R_4$, $R_5$ and $R_6$ each is an unsubstituted or substituted hydrocarbon residue, X is $-N-R_8-$, and $R_7$ and $R_8$ each is hydrogen or an unsubstituted or substituted hydrocarbon residue.

The acid salt is an alkali metal salt such as sodium salt or potassium salt or an ammonium salt.

Typical examples of the acid salts are ethylenediamine tetraacetic acid disodium salt (dihydrate), ethylenediamine tetraacetic acid tetrasodium salt, ethylenediamine tetraacetic acid tetrapotassium salt, ethylenediamine tetraacetic acid diammonium salt, etc.

These acids and the salts thereof are described in German Patent No. 866,605; British Patent Nos. 746,567 and 933,008; and U.S. Pat. Nos. 3,227,552 and 3,582,322.

Representative aminopolycarboxylic acids which can chelate iron are as follows:
Nitrilotriacetic acid,
Ethylenediaminetetraacetic acid,
Diethylenetriaminepentaacetic acid,
o-Diaminecyclohexanetetraacetic acid,
Ethyleneglycol-bis-(aminoethylether)-tetraacetic acid,
Diaminopropanol tetraacetic acid,
N-(2-Hydroxyethyl)ethylenediaminetriacetic acid,
Ethylaminodipropionic acid,
N-(carboxymethyl)-N'-2-hydroxyethyl-N,N'-ethyleneglycine and the like. Other similar acids can be used to obtain the same result.

The aminopolycarboxylic acid can be used in the form of the free acid or can be partially or completely neutralized. In general, it is often preferred to use an acid which has previously been partially neutralized because the reaction solution tends to be acidic with the dissolution and complex-formation of metal when it is used in the form of free acid.

For example, the hydrogen atom of at least 1 carboxyl group can be substituted with another substituent such as an alkali metal or ammonium group. For EDTA, complete neturalization requires an equimolar amount of the neutralizing material, e.g., sodium hydroxide, and partial neutralization is merely conducted by adding the neutralizing material in an amount less than the equimolar amount to substitute the desired number of hydrogen atom in the carboxyl group(s). The procedure of neutralization is well known in the art, and, as is common knowledge, temperature, time, etc., are unimportant factors.

When the aminopolycarboxylic acid is used both in the form of free acid or in the partially neutralized form, the reaction product can be, if desired, treated with a base to neutralize the same after the reaction of metallic iron and the oxidation.

As suitable bases, there can be mentioned, for example ammonium or alkali metal bases such as ammonium hydroxide, sodium hydroxide, potassium hydroxide, etc.

The neutralization can also be performed by using water soluble amine bases including primary, secondary, tertiary or quaternary aliphatic, cycloaliphatic, aromatic or heterocyclic amines. As examples of suitable amines, there can be mentioned methyl amine, dimethyl amine, trimethyl amine, ethyl amine, diethyl amine, triethyl amine, monoethanol amine, diethanol amine, triethanol amine, propyl amine, butyl amine, amyl amine, hexyl amine, cyclohexyl amine, aniline, m-toluidine, pyridine, methyl pyridine, morpholine, piperidine and the like.

As will be clear to one skilled in the art, the general rule for the neutralization is that any alkali compound can be used, and one merely selects an alkali compound which forms a neutralized product having characteristics suitable for the proposed end use. Thus, applicant purposely uses the broad term "base" since the invention at this point is broad.

For the separation of iron(III)-aminopolycarboxylic acid as solid crystals, the crystals can be separated from the reaction solution (which has been neutralized, if desired) by cooling and condensing the same.

The reaction solution can be used as it is when it is to be used as a photographic treatment solution. That is, the reaction solution is free from obstructive impurity ions so that it can be used as it is or after the addition of known bleaching solution or bleach-fixing solution components.

Further, the process according to this invention can be applied to aqueous solutions which contain a thiosulfate or thiosulfite with the addition of an aminopolycarboxylic acid salt to directly prepare a bleach-fixing solution.

Typical bleach or bleach-fixing solutions are described in German Patent No. 866,605; British Patent Nos. 746,567 and 933,008 and U.S. Pat. Nos. 3,227,552 and 3,582,322.

According to the process of this invention, the aqueous solution of iron(III)-aminopolycarboxylic acid complex salt can be prepared at ordinary temperature with simple equipment and little labor, so it is easily employed on an industrial scale. Most especially, the starting materials for the reaction, i.e., aminopolycarboxylic acid, metallic iron and air(oxygen)provide a complex salt product (or its aqueous solution) at low cost, resulting in the simple and inexpensive preparation of a bleaching solution or bleach-fixing solution.

In the reaction of the present invention, two cases must be considered. In the case where prepared reaction products are used per se as a bleach solution or blix solution, the amount of aminopolycarboxylic acid in the aqueous medium is about 5 to about 200 g/liter, preferably 20 to 100 g/liter. In the case where reaction products are used as a concentrated bleach or blix solution, the amount thereof is about 50 to about 1000 g/liter, preferably 100 to 800 g/liter.

It is to be specifically noted that in the reaction of the present invention the reaction temperature is not overly important, and can vary over ranges from close to freezing to close to boiling. However, speaking in a more practical manner, there is no need to run the reaction of the present invention at other than room temperature in most circumstances.

The time of reaction is set by the total surface area of the metallic iron and the speed of air introduction.

As the total surface area of the metallic iron is increased, the reaction time is reduced, and so small steel wool or finely divided steel powder is preferably used. For example, steel wire having a diameter of not greater than 1 mm, especially steel wool having a diameter of not greater than 0.1 mm, and steel balls having a diameter of not greater than 1 mm, especially steel powder having a diameter of not greater than 20 mesh, are preferably used. In fact, even if the total surface of the metallic iron is low the reaction can be carried out over a prolonged period because the prepared iron complex salt corrodes the metallic iron.

The aeration rate is sufficient so long as the metallic iron is agitated and well circulated in the reaction system.

The general rule regarding aeration rates is that greater rates of air introduction decrease the reaction time and lower rates of air introduction increase the reaction time. A similar effect is seen with the size of the air introduced, with small air bubbles decreasing the total reaction time and large air bubbles increasing the reaction time because of a surface area effect. Needless to say, the above factors can be balanced by one skilled in the art to achieve equal reaction rates at varying conditions.

The pressure of reaction is merely decided by the pressure head provided by the system. For example, if the height of the reaction system is 1 meter, the pressure head is 1 meter. The pressure of reaction is not overly important and, practically, reaction will merely be in a system open to the atmosphere. This does not preclude sub- or super-atmospheric operation since such does not essentially affect the reaction mechanism, but little would be gained by the more complicated systems required for sub- or super-atmospheric operation.

By following the above parameters, one can obtain the iron complex salt in yields of 75 to 98 weight percent, with low amounts of impurities such as unreacted materials, decomposed materials, oxides and the like.

It is thus seen that the present invention offers a substantial technical advance in the art of producing iron complex salts.

The term "aqueous medium" as it is used in the present invention includes not only water but water together with other materials, for example, organic solvents such as methanol, ethanol, propanol, butanol, acetone, ether, methyl cellosolve, ethyl cellosolve, methylethylketone, or polyethylene glycols. In this case, the amount of water is preferably not less than about 50 wt percent of the aqueous medium.

Having thus described the invention generally, the present invention is illustrated in greater detail by the following preferred but non-limiting working examples of the invention.

Unless otherwise indicated, all percentage in the examples are weight percentages.

EXAMPLE 1

29 g of N-hydroxyethyl-N,N',N'-ethylenediaminetriacetic acid were dissolved in 800 ml of water and ammonium hydroxide was added to adjust the pH to 3.5. 50 ml of a 1 percent aq. solution of N-hydroxyethyl-N,N',N'-ethylenediaminetriacetic acid-iron(III)-complex salt were added thereto and 5.58 g of iron powder (80 mesh particle size) were added while bubbling the system by vigorously introducing air, i.e., at a feed rate of 15 m$^3$/minute with an average bubble size of about 2 mm. The almost colorless reaction solution gradually turned reddish-brown with the bubbling of air and a transparent reddish-brown aqueous solution of N-hydroxyethyl-N,N',N'-ethylenediaminetriacetic acid-iron(III) complex salt was obtained after the complete dissolution of iron powder. The reaction was conducted for about 12 hours at a temperature of about 25°–30°C at a 30–50 cm water pressure head. By analysis, the amount of iron(III) complex salt formed was 0.10 mol.

5 g of borax, 5 g of sodium sulfite and 120 g of sodium thiosulfate were added to the above solution to adjust the pH to 5.5 (at 25°C), and water was added to make the whole 1 liter.

The resulting bleach-fixing solution showed a natural voltage of 20 mV vs SCE at 25°C and bleach-fixed developed silver.

EXAMPLE 2

80 ml of a 5 percent aq. solution of ethylenediaminetetraacetic acid iron(III) ammonium were added to a slurry of 293 g (1 mol) of ethylenediaminetetraacetic acid and 68 ml (1 mol) of 28 percent aq. ammonia in 1 liter of water. 50.2 g of steel wool (0.1 mm in diameter) were then added thereto and air was introduced with vigorous bubbling. After about 4 hrs, 28 percent aq. ammonia was added to adjust the pH to 7.0. The resulting dark reddish brown solution contained 0.91 mol of ethylenediaminetetraacetic acid iron(III) ammonium and the total EDTA amount was 1 mol. The rate of air introduction, bubble size, temperature, time and water head were as in Example 1.

EXAMPLE 3

About 500 ml of water, 55.6 g of N-hydroxyethylethylenediamine-N,N',N'-triacetic acid (0.2 mol) and 11.2 g of steel wool (wool-processed iron) were added to 500 ml of an aqueous solution containing 33.1 g (0.1 mol) of N-hydroxyethylethylenediamine-N,N',N'-triacetic acid iron(III) chelate compound, and air was blown into the mixture for 8 hrs. to dissolve the steel wool. The resulting solution was added to water to make the whole 1 liter.

Analysis of composition:

| | |
|---|---|
| Iron(III) Ions | 15.4 g/liter |
| N-Hydroxyethylethylenediamine-triacetic Acid | 63.9 g/liter |

(Yield: 87.5%).

Unless otherwise described, all reaction parameters were as in Example 2, i.e., size of steel wool, rate of air introduction, bubble size, temperature and water head pressure. It is to be noted that in this example the water-soluble iron salt was the chelate.

EXAMPLE 4

20 ml of a 0.2 molar aq. solution of N-hydroxyethylethylenediamine-N,N',N'-triacetic acid iron(III) chelate and 5.56 g of N-hydroxyethylethylenediamine-N,N',N'-triacetic acid were mixed with 160 ml of water to dissolve them, ammonia was added to make the pH 4.4, 1.05 g of steel wool was added and then air was blown into the system. After 5 hrs, the total amount of solution was made 200 ml by the addition of water.

Analysis of composition:

| | |
|---|---|
| Iron Ions | 6.23 g/liter |
| N-Hydroxyethylethylenediamine-triacetic Acid | 27.2 g/liter |

(Yield: 98.9%).

All reaction conditions were, unless otherwise indicated, the same as in Example 2, i.e., size of steel wool, rate of air introduction, bubble size, temperature and pressure.

While the invention has been described in detail and with reference to specific embodiments thereof, it will be apparent to one skilled in the art that various changes and modifications can be made therein without departing from the spirit and scope thereof.

What is claimed is:

1. A process for the preparation of an aqueous solution of iron(III)-aminopolycarboxylic acid complex compound characterized by mixing an aminopolycarboxylic acid capable of forming a chelate with a ferric ion or a salt thereof and metallic iron in an aqueous medium and reacting the mixture with oxygen in the presence of a water soluble iron salt.

2. The process of claim 1 wherein said aminopolycarboxylic acid is represented by the formula:

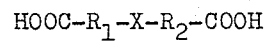

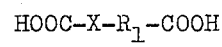

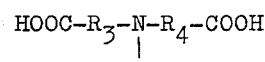

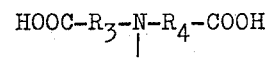

or

HOOC-R$_3$-N-R$_4$-COOH
    |
    R$_5$
    |
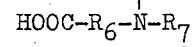

wherein $R_1$, $R_2$, $R_3$, $R_4$, $R_5$ and $R_6$ each is an unsubstituted or substituted hydrocarbon residue, X is $-N-R_8-$, and $R_7$ and $R_8$ each is hydrogen or an unsubstituted or substituted hydrocarbon residue.

3. The process of claim 1 wherein said aminopolycarboxylic acid salt is an alkali metal salt or an ammonium salt.

4. The process of claim 1 wherein said aqueous medium comprises at least 50 weight percent water, the balance of said aqueous medium being an organic solvent.

5. The process of claim 1 wherein the amount of water-soluble iron salt present is about 0.1 percent by weight or greater of the iron(III)-aminopolycarboxylic acid complex compound.

6. The process of claim 5 wherein the amount of water-soluble iron salt is 1 to 10 percent by weight, based on the weight of the iron (III)-aminopolycarboxylic acid complex compound.

7. The process of claim 5 wherein said water-soluble iron salt is a salt of iron and an inorganic acid.

8. The process of claim 7 wherein said water-soluble iron salt is iron chloride, ferrous or ferric sulfate, ferrous or ferric nitrate, ferrous ammonium sulfate or ferric ammonium sulfate.

9. The process of claim 5 wherein the amount of metallic iron is equimolar to 10 percent excess over equimolar, based on the aminopolycarboxylic acid.

10. The process of claim 9 wherein said aminopolycarboxylic acid is selected from nitrilotriacetic acid, ethylenediaminetetraacetic acid, diethylenetriaminepentaacetic acid, o-diaminecyclohexanetetraacetic acid, ethyleneglycol-bis-(aminoethylether)-tetraacetic acid, diaminopropanol tetraacetic acid, N-(2-hydroxyethyl)ethylenediaminetriacetic acid, ethylaminodipropionic acid and N-(carboxymethyl)-N'-2-hydroxyethyl-N,N'-ethyleneglycine.

11. The process of claim 9 wherein the amount of aminopolycarboxylic acid in the aqueous medium is from about 5 to about 200 g/liter.

12. The process of claim 9 wherein the amount of aminopolycarboxylic acid in the aqueous medium is from about 50 to about 1,000 g/liter.

13. The process of claim 9 wherein the metallic iron is steel wool having a diameter of not greater than 1 mm, steel balls having a diameter not greater than 1 mm or a mixture thereof.

14. The process of claim 1 wherein the aminopolycarboxylic acid is partially neutralized.

15. The process of claim 1, wherein the reaction is carried out at about room temperature.

* * * * *